United States Patent [19]

VanBuskirk et al.

[11] Patent Number: 5,281,676
[45] Date of Patent: Jan. 25, 1994

[54] PROCESS FOR PRODUCING AND POLYESTER COMPOSITIONS COMPRISING LACTAMYL PHOSPHITES AS CHAIN EXTENDING AGENTS

[75] Inventors: Bruce VanBuskirk, Dover; Murali K. Akkapeddi; Jeffrey H. Glans, both of Morristown, all of N.J.

[73] Assignee: AlliedSignal Inc., Morris Township, Morris County, N.J.

[21] Appl. No.: 893,184

[22] Filed: Jun. 3, 1992

[51] Int. Cl.$^5$ .................... C08G 63/68; C08G 79/02
[52] U.S. Cl. .................... 525/437; 525/418; 528/257; 528/308.1
[58] Field of Search ............... 525/437, 418; 528/287

[56] References Cited

U.S. PATENT DOCUMENTS 4,568,720 2/1986 Aharoni et al. .
5,037,897 8/1991 Glans et al. .
5,070,152 12/1991 Glans et al. .
5,118,805 6/1992 Glans et al. .

OTHER PUBLICATIONS

R. Mateva, Journal of Polymer Science, Part A—Polymer Chemistry 30 1449 (1992).

Primary Examiner—James J. Seidleck
Assistant Examiner—Mary Critharis
Attorney, Agent, or Firm—Roger H. Criss

[57] ABSTRACT

Processes for producing and polyester compositions of intermediate and high molecular weights are attained by reacting with at least one lower molecular weight polyester with an effective amount of a lactamyl phosphite as a constituent. The reaction may be carried out by blending these constituents and any other optional constituents and is preferably formed by melt blending.

12 Claims, No Drawings

PROCESS FOR PRODUCING AND POLYESTER COMPOSITIONS COMPRISING LACTAMYL PHOSPHITES AS CHAIN EXTENDING AGENTS

BACKGROUND

1. Field of the Invention

The present invention relates to polyester compositions, more particularly to compositions and processes which are related to chain extended polyester compositions.

2. Description of the Prior Art

Polyester compositions are known as useful in a wide range of applications as engineering materials due to their favorable physical properties. However, the use of various type of polyesters is sometimes limited due to shortcomings due to their molecular weight and/or molecular weight distribution. For example, low molecular weight polyesters may not be suitable in applications wherein a higher molecular weight material due to the physical requirements of a particular fabrication process, such as in blow molding operations and the like. To overcome such a limitation it is known to the art to provide one or more reactive compositions to one or more polyesters to so effectuate linking of the individual polyester molecules via reactive coupling such as by reactive coupling of terminal groups to form a chain extended polyester molecule having a higher molecular weight. Other reactive coupling is also known to the art such as by cross linking two or more polyester molecules, so-called "grafting reactions" wherein one or more molecules are appended at a point intermediate the end groups in a polyester molecule chain as well as where three or more polyester molecules are coupled by their terminal groups via a reactive composition.

U.S. Pat. No. 4,568,720 provides processes for producing chain extended polyesters by reacting one or more polyesters with an effective amount of one or more phosphite compounds; toxic phenolic compounds are produced in the practice of this invention.

U.S. Pat. No. 5,037,897 provides compatabillized blends of polyphenylene oxides and polyesters which are compatibillized by the use of an effective amount of a phosphoroustrislactam.

While these and other compositions and processes in the art have provided useful methods for producing and compositions comprising chain extended polyesters there remains a continuing need in the art for compositions of and techniques for producing chain extended polyesters.

SUMMARY OF THE INVENTION

In one aspect of the invention, there are provided polyester compositions of intermediate and high molecular weights which are attained by reacting with at least one lower molecular weight polyester with an effective amount of a lactamyl phosphite as a constituent. The reaction may be carried out by blending these constituents and any other optional constituents in a melt. The lactamyl phosphite acts as chain extender to the polyesters, and thereby providing materials which exhibit improved physical characteristics than those provided in the art.

Further aspects of the invention not particularly recited here will become apparent upon a reading of the accompanying specification of the preferred embodiments and the claims below.

DESCRIPTION OF THE PREFERRED EMBODIMENTS

Composition of the present invention include the reaction product of one or more polyesters with one or more lactamyl phosphites.

Polymers which may be employed in the process of this invention are linear or branched polyesters, which may be used singly or in mixture of two or more types of polyesters. The particular polyester or polyesters selected may be homopolyesters, copolyesters or mixtures thereof. Generally the polyesters used are the condensation product of an organic dicarboxylic acid and an organic diol, which will be more particularly described below. The type of polyester is not critical and the particular polyester chosen for use in any particular situation will depend essentially on the ultimate physical properties of the final article of manufacture.

Suitable polyesters include those which are the condensation reaction products of aromatic, cycloaliphatic and aliphatic diols. Particularly suitable aromatic diols include those having from 6 to 12 carbon atoms, such as but not limited to:
bis-(p-hydroxyphenyl)ether,
bis-(p-hydroxyphenyl)thioether,
(bis-(p-hydroxypehnyl)-sulphone,
(bis-(p-hydroxyphenyl)-methane),
(bis-(p-hydroxyphenyl)-ethane),
1-phenyl-(bis-(p-hydroxyphenyl)-methane),
diphenyl-(bis-(p-hydroxyphenyl)-methane),
2,2-bis(4'-hydroxy'-dimethylephenyl)propane,
1,1-or 2,2-(bis(p-hydroxyphenyl)-butane,
1,1-dichloro-or   1,1,1-trichloro-2,2-(bis-(p-hydroxyphenyl)-ethane)
1,1-(bis-(p-hydroxyphenyl)-cyclopentane)
2,2-(bis-(p-hydroxyphenyl)-propane (bisphenol A),
1,1-(bis-(p-hydroxyphenyl)-cyclohexane) (bisphenol C),
p-xylene glycol,
2,5-dichloro-p-xylylene glycol,
p-xylene diol, and the like.

Useful cycloaliphatic diols include those from about 5 to about 8 carbon atoms, of which 1,4-dihydroxy cyclohexane, 1,4-dihydroxy methyicyclohexane, 1,3-dihydroxy cyclopentane, 1,5-dihydroxycycloheptane, 1,5-dihydroxycyclooctane, and 1,4-cyclohexane dimethanol are suitable non-limiting examples.

Suitable aliphatic diols include but are not limited to diols of from about 2 to about 12 carbon atoms, especially preferred being those having from about 2 to about 6 carbon atoms. Examples of such preferred diol precursors include 1,2-propylene glycol, 1,3-propylene glycol, ethylene glycol, 1,8-octanediol, 1,4-nonanediol, neopentyl glycol, pentyl glycol, 1,6-hexanediol, 1,4-butanediol, and the like. Cydoaliphatic diols and aliphatic diols are preferred for use. Propylene glycol, ethylene glycol, neopentyl diol, 1,4-dihydroxy methylcyclohexane and 1,4-butanediol are particularly preferred.

Suitable dicarboxylic acids which find use as precursors in the preparation of useful polyesters include linear and branched chain saturated aliphatic dicarboxylic acids, aromatic dicarboxylic acids and cycloaliphatic dicarboxylic acids. Polyesters containing up to about 80% repeat units of monomer containing both hydroxyl and carboxylic groups may also be used in the practice of this invention. Illustrative aliphatic dicarboxylic acids which can be used in this invention are those having from about 2 to about 50 carbon atoms, such as oxalic acid, malonic acid, dimethylmalonic acid, succinic acid, octadecylsuccinic acid, pimelic acid, adipic acid, trimethyladipic acid, sebacic acid, suberic acid, azelaic acid and dimeric acids (dimerization products of unsaturated aliphatic carboxylic acids such as oleic acid) and alkylated malonic and succinic acids, such as octadecylsuccinic acid, and the like. Illustrative of suitable cycloaliphatic dicarboxylic acids are those having from about 6 to about 15 carbon atoms, such as 1,3-cyclobutanedicarboxylic acid, 1,2-cyclopentanedicarboxylic acid, 1,3- and 1,4-dicarboxymethylcydohexane and 4,4-dicycloexyidicarboxylcic acid, and the like.

Polyester compounds prepared from the condensation of a diol and an aromatic dicarboxylic acid are preferred for use with this invention. Illustrative of such useful aromatic carboxylic acids are terephthalic acid, isophthalic acid, and o-phthalic acid, 1,3-, 1,4-, 2,6- as well as 2,7-naphthalenedicarboxylic acid, 4,4-diphenyldicarboxylic acid, 4,4-diphenylsulphone-dicarboxylic acW, 1,1,3-trimethyl-5-carboxy-3-(p-carboxyphenyl)-indane, diphenyi ether 4,4-dicarboxylic acid bis-p(carboxyphenyl)methane and the like. In the most preferred embodiments, poly(ethylene terephthalate) (herein sometimes referred to as "PET"), poly(butylene terephthalate) (herein sometimes referred to as "PBT"), and poly(1,4-cyclohexane dimethylene terephthalate) are the polyesters of choice, of which PET is the most preferred.

The compositions according to the instant invention further include at least one lactamyl phosphite which may be generally represented by the following formula [1]:

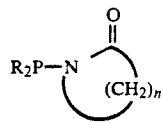

[1]

or alternately in accordance with formula [2]

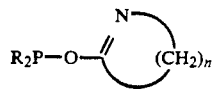

[2]

wherein the substituent group "R" may be any organic moiety such as an ethoxy, alkoxy, aryloxy, aryl, or alkyl group. Such lactamyl phosphites, especially wherein the substituent R is an ethoxy group is particularly described in an article by R. Mateva and N. Dencheva in the Journal of Polymer Science, Part A-Polymer Chemistry 30 1449 (1992). Further useful and preferred lactamyl phosphites are phosphoroustrislactams (sometimes hereinafter referred to as "TCP") which find use in the present invention. These phosphoroustrislactams are particularly described in U.S. Pat. No. 5,118,805 for "PHOSPHOROUSTRISLACTAMS AND METHODS FOR THEIR PRODUCTION", and assigned to the same assignee as the instant application, the complete contents of which are herein incorporated by reference. The phosphoroustrislactams may be described as compounds in accordance with formula [3], below

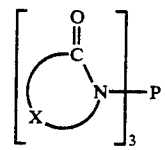

[3]

or alternately, in accordance with formula [4],

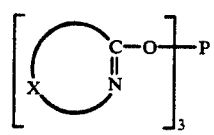

[4]

where X represents a chain of $CH_2$ monomer repeat units of at least 1 and including up to 11 $CH_2$ monomer repeat units.

The phosphoroustrislactams may be produced for example by the reaction of a phosphoroustrihalide and a lactam, preferably caprolactam by the dropwise addition of the phosphoroustrihalide to the lactam in an aprotic organic solvent such as tettrahydrofuran, dioxane or glyme, and subsequently washed such as with water. The phosphoroustrislactams and their method of production is described more fully in commonly assigned U.S. Pat. No. 5,118,805 the contents of which are herein incorporated by reference.

The lactamyl phosphites, especially the phosphoroustrislactams utilized as a chain extending agent induce what is believed to be a coupling reaction between the hydroxyl end group of the one polyester molecule with the carboxyl end group of a further polyester molecule which results in a higher molecular weight polymer. Under ideal circumstances, equimolar amounts of hydroxyl terminal groups of a polyester is reacted with the carboxyl terminal group of a further polyester in the presence of a phosphoroustrislactam. The coupling reaction liberates as byproducts equimolar amounts of a lactam and phosphorous acid derivatives. Due to the relatively inert nature of these byproducts, the reacted polyester compositions, lactam and phosphorous acid derivatives may be removed by conventional methods. One beneficial feature of this reaction is that none of the byproducts of the coupling reaction are phenol comprising compounds, which are presently known to have toxic characteristics, which benefit is in contrast to the use of a tri(phenyl phosphite) which forms phenol comprising compounds as a byproducts of its reaction.

What is to be understood by the term "effective amount" relative to the lactamyl phosphite is that an amount which is effective in providing sufficient coupling reactions between the terminal groups of the one or more polyesters and with the lactamyl phosphite which results in a chain extended polyester having a desired ultimate molecular weight. Such effective amounts may be readily determined experimentally and are to be understood to vary relative to the polyester or polyester used and the ultimate molecular weight to be produced. Generally, the required amount of lactamyl phosphite is expected to be less than 10 parts by weight ("pbw") relative to 100 pbw of the polyester or polyesters used; preferably even less. Exemplary compositions are more particularly detailed in the Examples described below.

Other optional constituents which may be incorporated into the blends according to the instant invention included such materials as fillers such as glass fibers or mineral fibers, impact modifiers, dyes, colorants, pigments, plasticizers, mold release agents, fire retardants, drip retardants, antioxidants, UV stabilizing agents, mold release agents, colorants, anti static agents, nucleating agents, thermal stabilizing agents, and the like. These optional constituents may be added to the mixture at any appropriate time during the production of the blend, and as they are well known to the art, are not here described with particularity. All of these optional constituents are commercially available.

The compositions according to the instant invention may be made by any technique or process, presently known or yet to be developed which will effect an intimate blending of the constituents of the compositions, particularly the polyester, lactamyl phosphite and any additional constituents. By way of example, such useful methods include formation of a solution in which the constituents are dissolved, suspended or dispersed in a suitable solvent, after which the solvent is removed from the resultant blend composition by conventional processes in order to form compositions in accordance with the teachings of the instant invention. An alternative technique is by the dry-blending the constituents in a dry particulate form, such as powders, pellets, flakes, prills or the like, and then heated to a temperature equal to or greater than the melting point of the highest melting constituent. A further variation on this technique which may be utilized where all of the desired constituents are not available in powder form, is an additional process steps of mixing any liquid constituents or constituents in liquid form, subsequent to dry blending of the constituents, and thoroughly mixing the constituents, as well as removal of excess liquids during processing by well known techniques.

The polyester or polyesters may be reacted with the lactamyl phosphites in any manner which is effective for the chain coupling reaction to occur. Such methods require only that the lactamyl phosphites and the polyester be well mixed and be at a sufficient temperature to allow for the coupling to occur. Exemplary techniques include batchwise fashions, or alternatively in continuous fashions. In the case of the former, a reaction vessel suitable to contain the constituents and to provide suitable reaction conditions, e.g. heat, temperature, adequate mixing of the constituents, atmosphere may be used, and such vessels include common laboratory glassware and flasks, Banbury mixers, and the like. In the case of the latter, an extruder of the single or multiple screw variety having at least one reaction zone may be utilized, as well as extruders having multiple zones, both in a series arrangement or in a parallel arrangement.

During production of compositions according to the instant invention, it is recognized that acceptable temperatures used in heating the constituents may vary over a wide range, and is dependent upon the constitution of any particular blend composition. Preferably, the temperature should be at least as high as the melting point of the polyester but at the same time, should not be as high as the degradation temperatures of the polyester. In particularly preferred embodiments, the temperature is such that the polyester will be retained in a molten state sufficiently long to allow for the lactamyl phosphite to react with polyester and form a block or graft copolymer therewith.

The heating of the constituents may be carried out in any manner whereby the temperature constraints outlined above are achieved. In one contemplated method, the heating step is carried out at a temperature which is equal to or greater than the melting point of the desired resultant composition. In an alternative method, the constituents are heated so that the temperature is increased as a function of time over the course of any heating process to cause the melting of constituents in the manner described in this specification, and to maintain this mixture in a molten state. Other methods not particularly described here, but which may be utilized in forming compositions according to the present invention are contemplated and considered within the scope of the invention.

Pressures are not contemplated to have any critical effect, and can be widely varied without adversely effecting the process of forming the inventive compositions. Consequently, heating can be conducted at pressures below, at, or above atmospheric pressure. In preferred embodiments, at least a portion of the heating step is carried out at a reduced pressure so to allow the removal of any volatile constituents or by-products.

The production of compositions may be conducted under normal atmospheric conditions, or in the absence of air. Alternatively, the production of compositions may be conducted in a controlled atmosphere, such as in the presence of an inert gas, such as argon, nitrogen, carbon dioxide, or other inert gas.

The time needed to react the constituents may vary over a wide range, and is recognized to be a factor of such effects as the polyester selected, additional constituents selected, the concentration of each of the constituents forming the composition, the temperatures to be used as well as the type of heating step used, as well as the type of reaction vessel and the manner of forming the composition. These are factors which are known in the art as effecting reaction times. In most instances, the reaction time will vary between from about 5 seconds up to about 25 hours, preferably, the reaction times vary between about 30 seconds to about 1 hour.

Preferably, the process of forming compositions in accordance with the instant invention includes a process step of removing any by-products of the reaction, as well as unreacted phosphite compounds. The methods used may be any conventional means which does not adversely effect the composition formed. In preferred embodiments, all or part of the unreacted phosphite compounds are removed as it is believed that such removal enhances the effectiveness of the grafting process and improves the mechanical and other properties of the blend. Ideally, a composition where all of the unreacted phosphite compounds are removed forms the most preferred embodiment of the invention, however it is concurrently recognized that complete removal is not always possible. Preferably, such techniques include formation of the blend under vacuum conditions or under reduced pressures, during any heating step.

The compositions of the instant invention are suitable for the formation of articles by subsequent molding or forming techniques, including but not limited to compression, injection, extrusion, as well as other techniques not particularly recited here, but which are nonetheless useful in forming formed articles therefrom. Particularly, the controllable molecular weights of the chain extended polyester composition taught herein which include blow molding operations, injection molding techniques and in extrusion production techniques.

While not wishing to be bound by any theory, it is hypothesized by the inventors that the present invention provides a method of effecting chain extension of one or more polyesters which is attained by reacting one or more polyesters with an effective amount of a lactamyl phosphite by control of the process conditions of the reaction, a wide range of molecular weights may be attained. Further, when two or more dissimilar polyesters are reacted with the lactamyl phosphite, especially phosphoroustrislactam, (hereinafter sometimes referred to as "TCP"), a compatible polyester blend is attained.

The foregoing invention will be more apparent by reference to specific embodiments which are representative of the invention. It is nonetheless to be understood that the particular embodiments described herein are provided for the purpose of illustration, and not be means of limitation, and that it is to be further understood that the present invention may be practiced in a manner which is not exemplified herein without departing from its scope.

EXAMPLES

In the following embodiments of the invention, it is to be understood that in the description of any composition, all percentages associated with a constituent used to form a composition are to be understood as to be "percentage by weight" of the particular constituent relative to the composition of which it forms a part; exceptions to this convention will be particularly noted.

COMPARATIVE EXAMPLE 1

A poly(ethylene terephthalate) homopolymer which may be characterized as having an intrinsic viscosity of 0.7 as measured in phenol/TCE at 25 deg. C. The PET homopolymer was determined to exhibit a reduced viscosity of 0.66 as measured in phenol/TCE at 25 deg. C. The PET homopolymer was also determined to have 0% insolubles.

EXAMPLE 1

A poly(ethylene terephthalate) homopolymer characterized as having an intrinsic viscosity of 0.7 as measured in phenol/TCE at 25 deg. C. was reacted with 1% of phosphoroustrislactam as prepared according to U.S. Pat. No. 5,118,805 and generally described above. The PET and the TCP were reacted by melt blending the same in the TW-100 extruder as described above.

The reacted PET was determined to exhibit a reduced viscosity of 0.88 as measured by indicating that an increase in the molecular weight had been achieved, and further was found to have 0% insolubles which indicated that no appreciable amount of crosslinked products were formed but rather, that linear chain extension was accomplished.

We claim:

1. A composition consisting essentially of:
 a polyester, and
 a lactamyl phosphite.

2. A composition according to claim 1 wherein the polyester is selected from the group consisting of poly(ethylene terephthalate) and poly(butylene terephthalate).

3. A composition according to claim 1 comprising wherein the lactamyl phosphite is a phosphoroustrislactam.

4. A composition according to claim 1 wherein the lactamyl phosphite comprises up to 10 parts by weight relative to 100 parts by weight of the polyester.

5. A composition according to claim 1 which further includes an optional constituent selected from the group consisting of glass fibers, mineral fibers, impact modifiers, dyes, colorants, pigments, plasticizers, mold release agents, fire retardants, drip retardants, antioxidants, UV stabilizing agents, mold release agents, colorants, antistatic agents, nucleating agents and thermal stabilizing agents.

6. A process for producing chain extended polyester compositions comprising the process step of:
 reacting one or more lactamyl phosphites with one or more polyesters.

7. The process according to claim 6 wherein the one or more lactamyl phosphites are one or more phosphoroustrislactams.

8. A composition prepared by the process of claim 6.

9. A composition according to claim 2 wherein said polyester is poly(ethylene terephthalate).

10. A composition according to claim 1 wherein said polyester is selected from the group consisting of poly(ethylene terephthalate) poly(butylene terephthalate) and poly(1,4-cyclohexane dimethylene terephthalate).

11. A composition according to claim 10 wherein said lactamyl phosphate is a phosphorous trislactam.

12. A composition according to claim 9 wherein said lactamyl phosphite is a phosphorous trislactam.

* * * * *